(12) United States Patent
Han et al.

(10) Patent No.: US 7,797,745 B2
(45) Date of Patent: Sep. 14, 2010

(54) MAC SECURITY ENTITY FOR LINK SECURITY ENTITY AND TRANSMITTING AND RECEIVING METHOD THEREFOR

(75) Inventors: Kyeong Soo Han, Daejeon (KR); Kwang Ok Kim, Jeollabuk-do (KR); Tae Whan Yoo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1350 days.

(21) Appl. No.: 11/266,627

(22) Filed: Nov. 3, 2005

(65) Prior Publication Data

US 2006/0136715 A1 Jun. 22, 2006

(30) Foreign Application Priority Data

Dec. 22, 2004 (KR) ........................ 10-2004-0110354
Jun. 10, 2005 (KR) ........................ 10-2005-0049681

(51) Int. Cl.
*G06F 12/14* (2006.01)
(52) U.S. Cl. ............................. 726/23; 726/22; 726/25; 713/151; 713/160; 713/189
(58) Field of Classification Search ........................ None
See application file for complete search history.

(56) References Cited

U.S. PATENT DOCUMENTS

2004/0028409 A1* 2/2004 Kim et al. ...................... 398/71
2005/0066166 A1* 3/2005 Chin et al. ................... 713/165
2006/0104301 A1* 5/2006 Beyer et al. .................. 370/445
2006/0112272 A1* 5/2006 Morioka et al. .............. 713/171

FOREIGN PATENT DOCUMENTS

KR 10-0352126 8/2002

OTHER PUBLICATIONS

"The Implementation of Rx MACsecY for Security Service in the EPON," Kwang-Ok Kim et al, Asian Info-communications Council Document No. 66, Nov. 22-26, 2004, pp. 1-9.

* cited by examiner

*Primary Examiner*—Pramila Parthasarathy
(74) *Attorney, Agent, or Firm*—Ladas & Parry LLP

(57) ABSTRACT

An apparatus and method for providing a security function of frames transmitted between optical network terminals (OLTs) and optical network units (ONUs) in an Ethernet passive optical network (EPON) providing media access control (MAC) services are provided. The apparatus includes: a frame classifier distinguishing the type of a frame, and based on the logical link identifier (LLID) of the distinguished frame, determining whether or not the frame is a security link to which a security function is to be applied; a bypass unit delaying a no-security-function frame so that a processing time for converting the security-function-applied frame classified in the frame classifier into an encrypted frame is the same as a time for processing the no-security-function frame; and a parameter generation unit transmitting in relation to each of the LLIDs, a parameter set value including a security-function-application setting signal used in the encryption, decryption and authentication of the frame, a frame decryption signal, an encryption mode selection signal, and an authentication intensity adjustment signal.

16 Claims, 12 Drawing Sheets

FIG. 10

| MAC FRAME ENCRYPTION MODE PARAMETER (MPCP/OAM/DATA) | USER-SET DoS ATTACK APPLICATION MODE PARAMETER (MPCP/OAM/DATA) | PROCESSING OF INPUT FRAME |
|---|---|---|
| 001 | --1 | DoS ATTACK PROCESSING OF ONLY MAC FRAME |
| | --0 | NORMAL PROCESSING OF ALL FRAMES |
| 011 | -00 | NORMAL PROCESSING OF ALL FRAMES |
| | -01 | DoS ATTACK PROCESSING OF ONLY MAC FRAME |
| | -10 | DoS ATTACK PROCESSING OF ONLY OAM FRAME |
| | -11 | DoS ATTACK PROCESSING OF ONLY MAC/OAM FRAME |
| 101 | 0-0 | NORMAL PROCESSING OF ALL FRAMES |
| | 0-1 | DoS ATTACK PROCESSING OF ONLY MAC FRAME |
| | 1-0 | DoS ATTACK PROCESSING OF ONLY MPCP FRAME |
| | 1-1 | DoS ATTACK PROCESSING OF ONLY MAC/MPCP FRAME |
| 111 | 000 | NORMAL PROCESSING OF ALL FRAMES |
| | 001 | DoS ATTACK PROCESSING OF ONLY MAC FRAME |
| | 010 | DoS ATTACK PROCESSING OF ONLY OAM FRAME |
| | 011 | DoS ATTACK PROCESSING OF ONLY MAC/OAM FRAME |
| | 100 | DoS ATTACK PROCESSING OF ONLY MPCP FRAME |
| | 101 | DoS ATTACK PROCESSING OF ONLY MAC/MPCP FRAME |
| | 110 | DoS ATTACK PROCESSING OF ONLY OAM/MPCP FRAME |
| | 111 | DoS ATTACK PROCESSING OF ALL FRAMES |
| 000 | | REGARD ALL CASES NOT CORRESPONDING TO ENCRYPTION MODE, DoS |

MAC SECURITY ENTITY FOR LINK SECURITY ENTITY AND TRANSMITTING AND RECEIVING METHOD THEREFOR

CROSS-REFERENCE TO RELATED PATENT APPLICATIONS

This application claims the benefit of KPA No. 10-2004-0110354, filed on Dec. 22, 2004 and KPA No. 10-2005-0049681, filed on Jun. 10, 2005, in the Korean Intellectual Property Office, the disclosure of which is incorporated herein in its entirety by reference.

BACKGROUND OF THE INVENTION

1. Field of the Invention

The present invention relates to an apparatus and method for providing a security function for frames transmitted between optical network terminals (OLTs) and optical network units (ONUs) in an Ethernet passive optical network (EPON) providing media access control (MAC) services. More specifically, the present invention relates to an apparatus and method for operating security policies in relation to each frame in an EPON, checking secrecy of the frames, authentication, integrity, counterattacking encryption attacks, and ranging frames passing through a MAC security apparatus.

2. Description of the Related Art

In a network layer, in order to provide a security function and an authentication function of frames to be transmitted, an IP security (IPSec) function or application-level security (Password) function is used.

However, along with recent developments in the scalability of local area networks (LAN), expansion to broadband networks, and high-speed L2 switching technology, security functions and authentication functions of frames are being demanded in communication services using only a data link layer.

In response to this demand, the IEEE 802 formed an IEEE 802.1AE working group, and is preparing methods for providing a MAC security function required in the data link layer, and standardizing the structure of a MAC security apparatus (MAC security entity). So far, Draft 2.0 of the MAC security entity has been released.

In the IEEE 802.3ah Ethernet in the first mile (EFM) standard, in order to provide a security function and authentication function in an EPON, a method and a structure being standardized in the IEEE 802.1AE working group are used.

Since it has a media-sharing point-to-point structure, an EPON is not secure and therefore a security function is needed. In the topology of an EPON, another ONU can eavesdrop on downward traffic while unauthenticated resource access by an ONU or the danger of disguise by another ONU can occur in upward traffic.

Accordingly, since secrecy of information should be provided to subscribers and protection of contents and billing capability in relation to subscribers' access should be provided to service providers, an EPON that is a subscriber network aims to provide integrity of subscriber traffic, and to block access by unauthenticated apparatuses and subscribers.

Therefore, in order to provide a frame security function and frame authentication function in an EPON ONU, a MAC security apparatus structure using the Galois/Counter Mode—advanced encryption standard (GCM-AES) algorithm is needed and this structure should be implemented so that it can be compatible with a conventional EPON structure. Also, a protection function against a variety of encryption attacks should be provided.

SUMMARY OF THE INVENTION

The present invention provides an apparatus and method for providing a security function of frames in a MAC security transmission and/or reception apparatus capable of providing in an EPON link, the MAC Security technology that is being standardized by the IEEE 802.1AE working group.

According to an aspect of the present invention, there is provided a MAC security apparatus including: a MAC security transmission unit classifying a frame based on the LLID value and the type of the frame, generating a first parameter set for setting or canceling information indicating whether or not a security function is to be applied, in relation to the type of the frame based on the LLID, determining whether or not the security function is to be applied to the frame, and delaying a no-security-function frame so that a processing time for converting a security-function-applied frame into an encrypted frame is the same as time for processing the no-security-function frame; and a MAC security reception unit checking based on the LLID value whether or not an encryption mode of a frame is set, determining based on the type value of the frame whether the frame is an encrypted frame or a non-encrypted plaintext frame, processing a DoS attack frame in relation to each frame based on the frame type value, generating a second parameter set value used in the authentication and decryption of the frame, and delaying the plaintext frame so that a processing time taken for decrypting the encrypted frame is the same as a processing time of the plaintext frame.

According to another aspect of the present invention, there is provided a frame transmission and reception method in a MAC security apparatus including: classifying a frame and determining whether or not a security function is applied, based on the LLID value and the type of the frame; in relation to each of the LLIDs, transmitting a parameter set value, including a security-function-application setting signal used in the encryption, decryption and authentication of the frame, a frame decryption signal, an encryption mode selection signal, and an authentication intensity adjustment signal; delaying the no-security-function frame so that a processing time for converting the security-function-applied frame into an encrypted frame is the same as a processing time for the no-security-function frame; authentication decrypting or authenticating the frame; based on the LLID value, determining whether or not an encryption mode is set in the frame; determining based on the type value of the frame whether the frame is an encrypted frame or a non-encrypted plaintext frame, and processing a DoS attack frame in relation to each frame based on the frame type value; delaying the plaintext frame so that a processing time taken for decrypting the encrypted frame is the same as a processing time of the plaintext frame; and transmitting a second parameter set value used in the authentication and decryption of the frame.

BRIEF DESCRIPTION OF THE DRAWINGS

The above and other features and advantages of the present invention will become more apparent by describing in detail exemplary embodiments thereof with reference to the attached drawings in which:

FIG. 10 is a table showing processing steps of an input frame with respect to a user-set service denial attack application parameter value in relation to each frame according to an embodiment of the present invention.

DETAILED DESCRIPTION OF THE INVENTION

Figure 1:
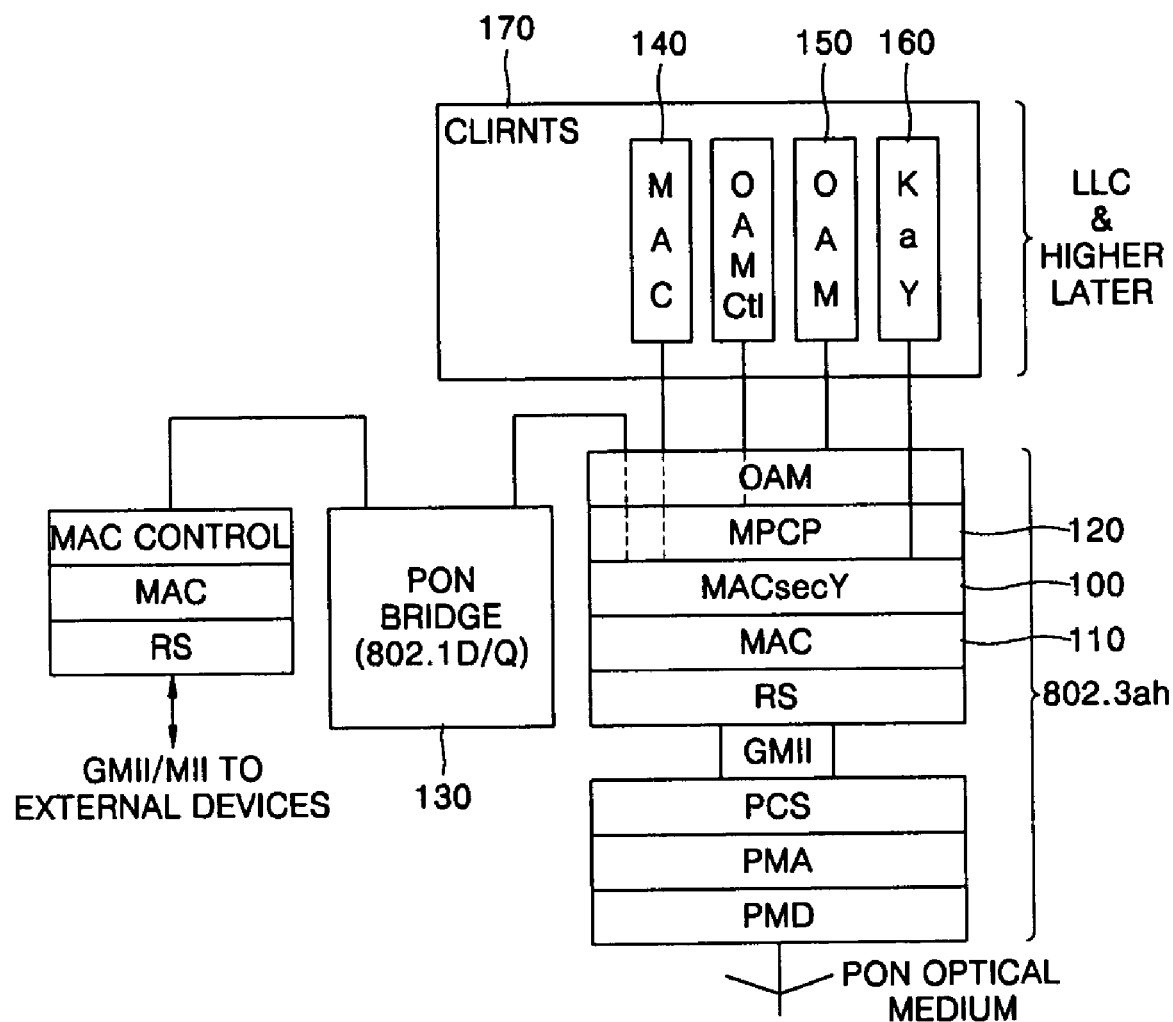
FIG. 1 illustrates a layered structure of an Ethernet passive optical network (EPON) supporting a security service according to an embodiment of the present invention.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the thickness of layers and regions are exaggerated for clarity. Like reference numerals in the drawings denote like elements, and thus their description will be omitted.

FIG. 1 illustrates a layered structure of an Ethernet passive optical network (EPON) supporting a security service according to an embodiment of the present invention.

A hacker can alter a received frame by modifying a logical link identifier (LLID). Accordingly, all frames transmitted on the EPON should be encrypted. When all of the transmitted frames are encrypted, the hacker cannot decrypt a frame even though a frame of a predetermined ONU is received. In order to encrypt all frames in the EPON network a MAC security apparatus 100 should be positioned between a MAC layer 110 and a multi point control protocol (MPCP) layer 120. At this time, the MAC security apparatus can selectively encrypt a data frame selected from a group consisting of a PON bridge 130, an MPCP frame 140, and an OAM frame 150, according to user input.

A KaY 160 (a security function application policy set by an administrator) input from a client 170 provides management of an encryption key of a MAC security apparatus and status management.

Figure 2:
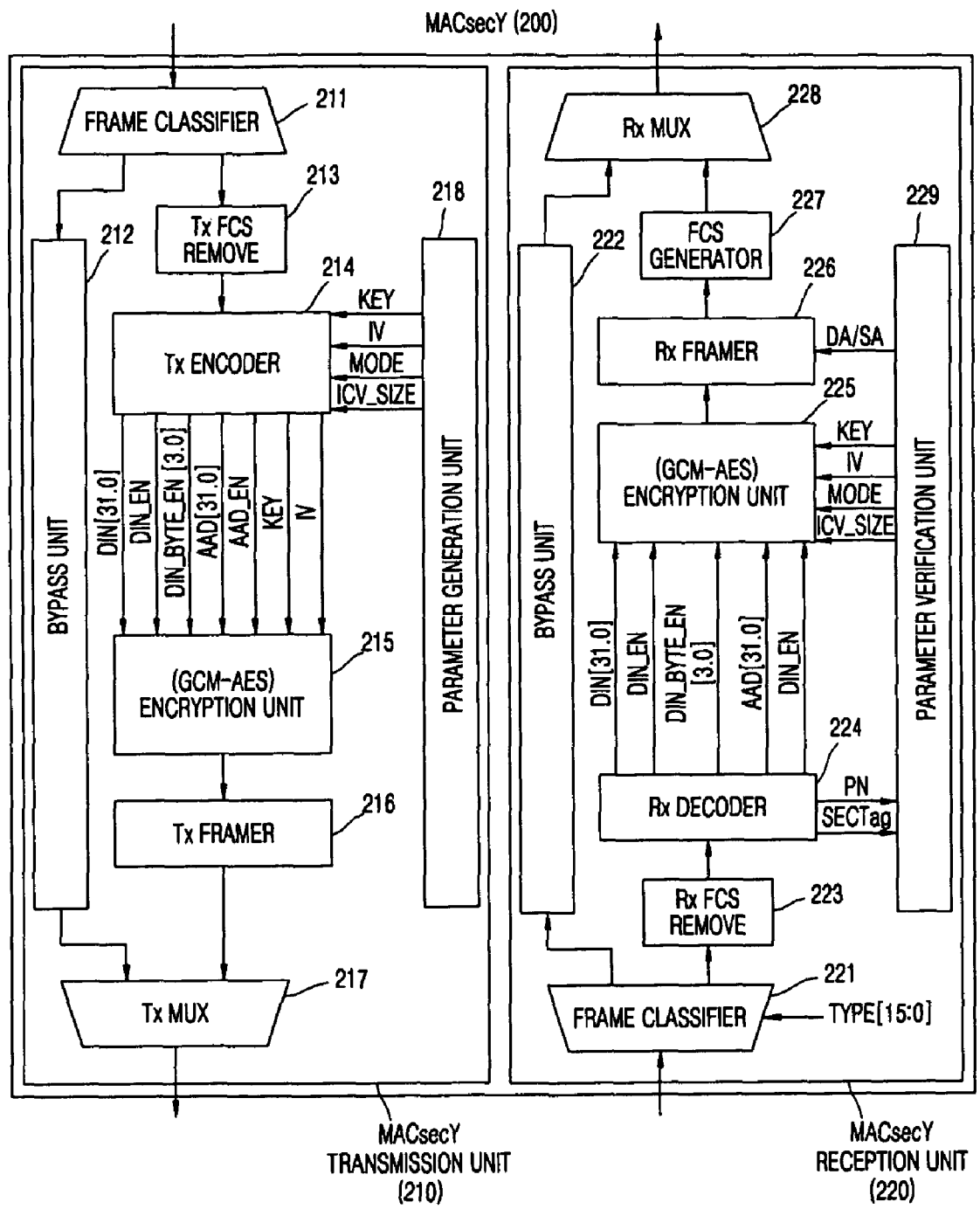
FIG. 2 is a detailed block diagram of a media access control (MAC) security apparatus according to an embodiment of the present invention.

FIG. 2 is a detailed block diagram of a MAC security apparatus according to an embodiment of the present invention.

A MAC security apparatus 200 according to the current embodiment of the present invention performs encryption and/or decryption of frames that are being input at a speed of 1 Gbps or 2 Gbps, and frame authentication. The MAC security apparatus 200 includes a MAC security apparatus transmission unit 210 and a MAC security apparatus reception unit 220.

The MAC security apparatus transmission unit 210 includes a frame classifier 211, a bypass unit 212, a transmission frame check sequence (FCS) remover 213, a transmission frame encoder 214, an encryption unit 215, a transmission framer 216, a transmission frame multiplexer 217, and a parameter generation unit 218.

The MAC security apparatus reception unit 220 includes a bypass unit 222, a reception FCS remover 223, a reception frame decoder 224, an encryption unit 225, a reception framer 226, a reception FCS generation unit 227, a reception frame multiplexer 228 and a parameter verification unit 229.

Operations of the MAC security apparatus transmission unit 210 will now be explained.

The frame classifier 211 confirms the type of a frame being input according to a security function application policy set by an administrator, and determines whether or not to apply a security function to the frame. Then, if a security function is to be applied to the frame, the frame is transmitted to the transmission FCS remover, and if a non-security function is to be applied to the frame, the frame is transmitted to the bypass unit 212.

If the frame is input, the frame classifier 211 transmits the logical link ID (LLID) of the frame to the parameter generation unit 218. The parameter generation unit 218 transmits to the transmission frame classifier 221 a signal indicating whether or not the security function of the LLID is to be applied. According to this signal, the frame classifier 211 determines whether or not to apply the security function to the input frame. The signal can be sent to the parameter generation unit 218 through a CPU.

In addition, the frame classifier 211 divides frames into 3 types, frames transmitted by MAC clients, MPCP frames, and frames transmitted by other clients, and determines whether or not to apply the security function to each frame. In order to distinguish the frame type, the transmission frame classifier receives an input signal indicating the frame type when the frame is input.

Figure 3:
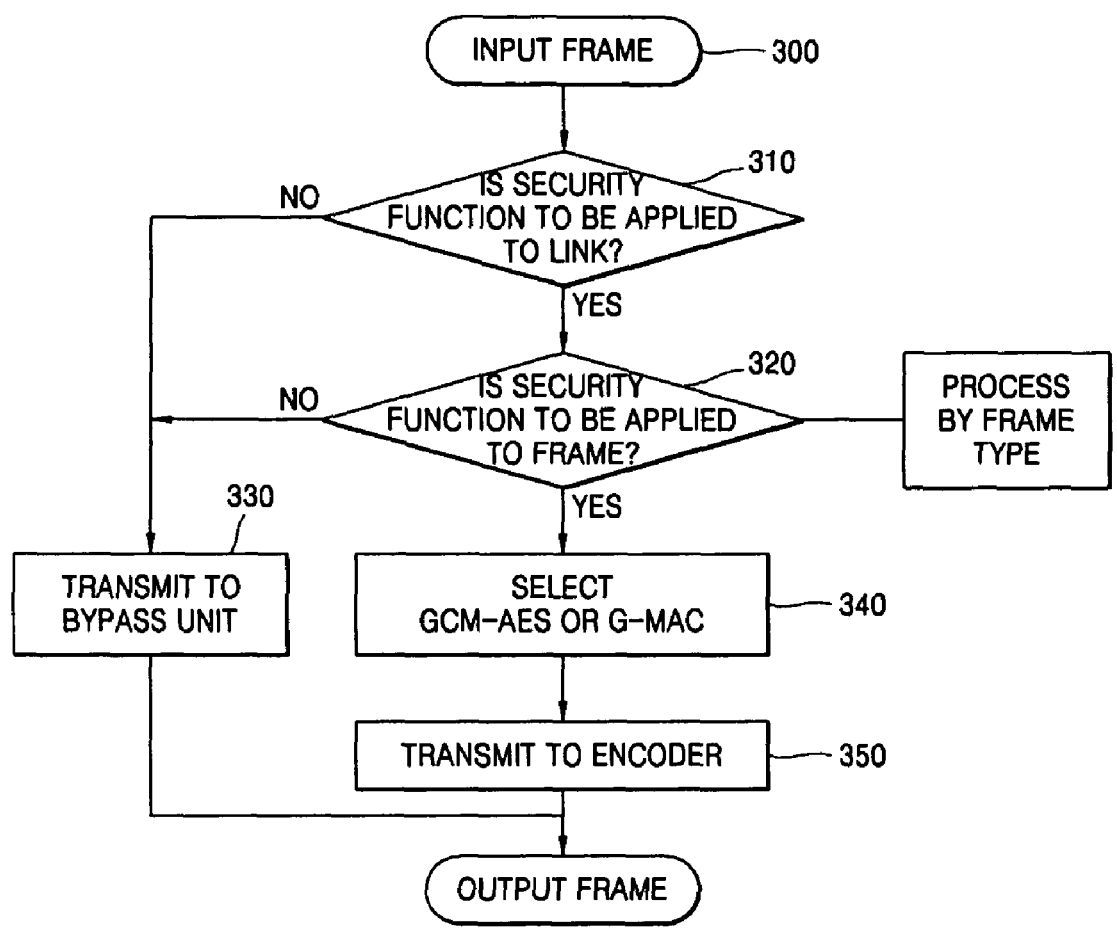
FIG. 3 is a flowchart illustrating a process in a frame classifier of a transmission unit of a MAC security apparatus according to an embodiment of the present invention.

In order to perform this operation, the frame classifier 211 can select whether or not to apply the security function to an input frame with respect to each LLID and frame type. This is illustrated in FIG. 3 and will be explained later.

The bypass unit 212 performs a function delaying the no-security-function frame so that the processing time taken for converting the security-function-applied frame classified in the frame classifier 211 into an encryption frame is the same as the processing time of the no-security-function frame.

By making the security-function-applied frame and the no-security-function frame have an identical delay time, ranging and upward transmission time allocation in an EPON can be made to be accurate.

The delay time processed in the bypass unit 212 is as follows:

Frame bypass delay time=transmission FCS remover delay time+transmission frame decoder processing time+encryption authentication encryption processing time+transmission frame assembly processing time However, the delay time is a preferred embodiment of the present invention and it should be noted that the present invention is not limited to this and changes, alterations and modifications can be made without departing from the spirit and scope of the present invention.

The transmission FCS remover 213 removes a 4-byte FCS attached to the end of a frame input from the frame classifier 211.

The transmission frame encoder 214 adds a SECTag (security tag) and packet number (PN) to the frame input from the transmission FCS remover 213, by using information regarding the frame received from the parameter generation unit 218 in order to make a MACsec frame structure, and then separates the structure into an IV value and encryption key, and an additional authentication data (ADD) unit and a secure MAC service data unit (MSDU), and transfers them to the encryption unit 215.

The encryption unit 215 authenticates or authentication-encrypts the input frame.

To the frame authenticated or authentication-encrypted through the encryption unit 215, the transmission framer 216 attaches the LLID and header of the frame and transmits the frame to the transmission multiplexer 217.

The transmission multiplexer 217 multiplexes and transmits the frame received from the transmission framer 216 and the bypass unit 212.

The parameter generation unit 218 stores parameter values on the encryption key, IV, PN, security policy and option in relation to each LLID, and transfers parameters stored in relation to the LLID corresponding to each frame, to other blocks.

Each element of the MAC security reception unit of FIG. 2 will be explained in more detail with reference to FIG. 4.

FIG. 3 is a flowchart illustrating a process in the frame classifier 211 of the MAC security transmission unit according to an embodiment of the present invention.

If a frame is input in operation 300, by checking the LLID value of the frame, it is determined whether or not the frame is a link to which a security function is to be applied in operation 310. If it is not the link to which the security function is to be applied, the frame is transmitted to the bypass unit 212, or else it is determined whether or not the security function is to be applied in relation to each frame in operation 320.

In relation to the frame to which the security function is to be applied, it is determined for each LLID of the frame whether to use a session key or a master key. Referring to FIG. 1, when encryption is used for the ONU and OLT in the EPON, it is set in operation 340 that if a frame is transmitted by the PON bridge 130, a session key is used, and if a frame is transmitted by the key agreement entity for MAC security (KaY) 160, a master key or a session key is used.

Selection of an encryption key to be used is determined by the KaY 160 and in the KaY 160, any one of the two encryption keys can be selected when necessary. After that, the frame is transmitted to an encoder in operation 350.

Figure 4:
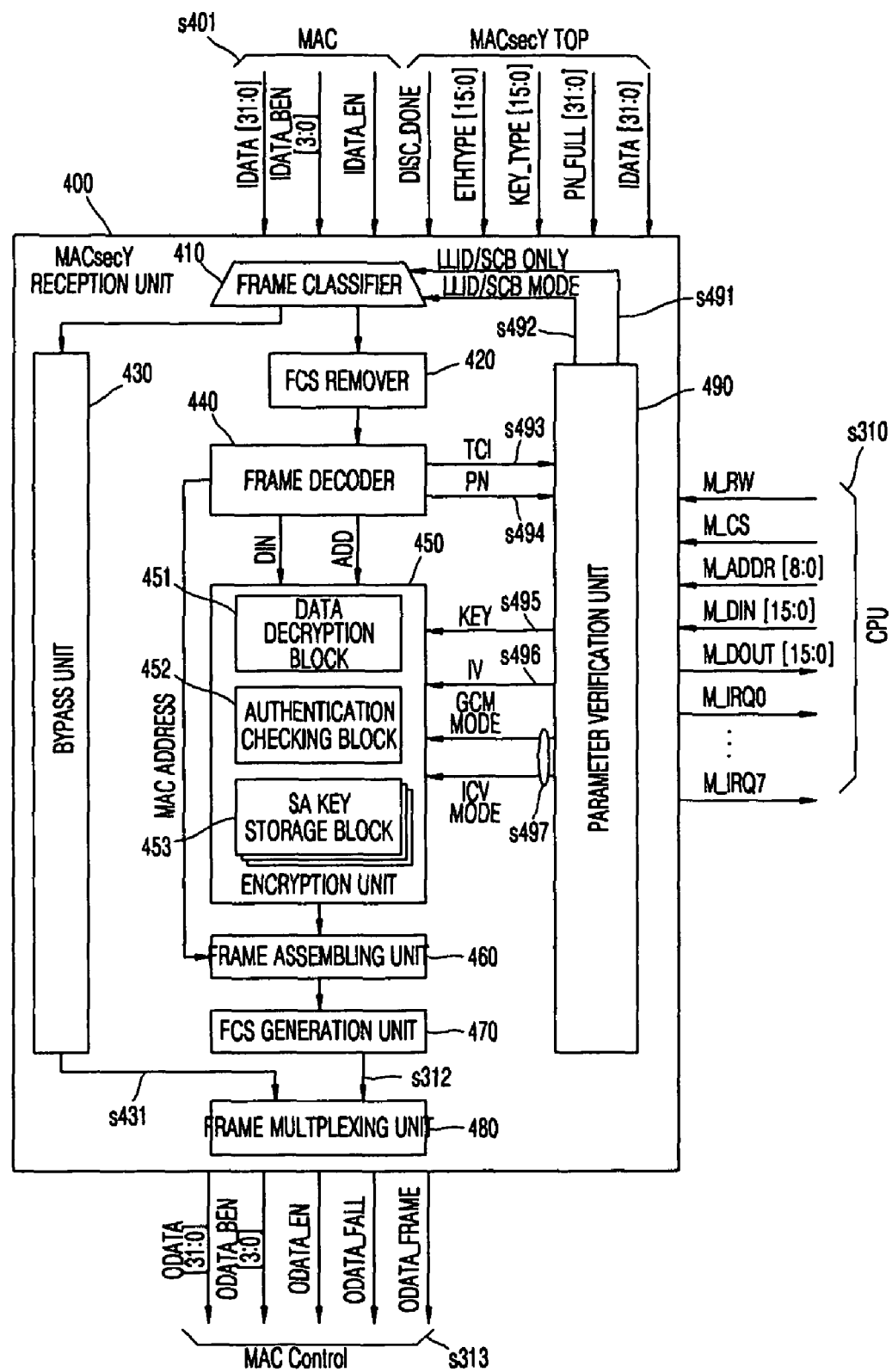
FIG. 4 is a detailed block diagram of a reception unit of a MAC security apparatus according to an embodiment of the present invention.

FIG. 4 is a detailed block diagram of a MAC security reception unit according to an embodiment of the present invention.

According to whether or not there is a MACsecY encryption operation of a verification parameter block set by the administrator through the KaY 160, the frame classifier 410 transmits the input frame as an encryption block or transfers it to a reception frame bypass block, or discards the frame according to the operation mode.

In other words, whether or not the security function is to be applied is identified based on the LLID value of the frame, and by using the Ethernet type field of the received frame, it is determined whether the frame is an encrypted frame or a non-encrypted frame.

In addition, when a non-encrypted plaintext frame is input in security function mode, or when an encrypted frame is input in non-security function mode, the frame classifier 410 deletes a frame such as a service denial attack frame.

That is, the frame classifier 410 can set a denial of service (DoS) attack frame with respect to the input frame type in operation S491. Based on the 16-bit Ethernet type value in the security tag field of the frame, it is determined whether the type of the frame is an encrypted frame or a plaintext frame, and whether the frame is a broadcast security channel or a unicast security channel. Then, based on a user-set parameter defining whether or not the security function is to be applied in relation to each frame type and security channel, and a DoS attack frame application mode parameter defined in relation to each of the user-set parameters, a DoS attack against the frame is processed.

The FCS remover module 420 performs a function removing a 4-byte FCS value in the encrypted frame input from the frame classifier 410. Since the encryption unit 450 decrypts an encrypted frame into a plaintext frame, a new FCS value for a plaintext MAC frame should be calculated after the decryption is finished. Accordingly, the FCS value is removed before an encrypted frame is input to the encryption unit 450.

The reception bypass unit 430 performs a function delaying the plaintext MAC frame so that the processing time taken for decoding an encrypted frame is the same as the processing time taken for a non-encrypted plaintext MAC frame. By making the encrypted frame and the non-encrypted frame have an identical delay time, the multi point MAC control module of the OLT in the EPON is made to be able to accurately perform ranging and allocation of a transmission time of an ONU. The delay time processed in the bypass unit 430 is as the follows:

> Reception frame bypass delay time=reception *FCS* remover delay time+reception frame decoder processing time+authentication decryption processing time in encryption unit+reception frame assembly processing time+FCS generator processing time However, the delay time is a preferred embodiment of the present invention and it should be noted that the present invention is not limited this and changes, alterations and modifications can be made without departing from the spirit and scope of the present invention.

The frame decoder 440 performs a function extracting information required for frame decryption, by using a 4-bit data counter with the encrypted frame input from the FCS remover module 420.

In the frame decoder 440, according to the 4-bit data counter value, the encrypted frame is divided into a MAC header, a SecTAG (security tag), a PN (S495), ADD and a Secure MSDU and transmitted.

The MAC header includes an 8-byte preamble, a 6-byte destination address, and a 6-byte source address. The SecTag is formed with a MACsecY Ethertype field and a tag control information (TCI) value (S304). The PN value is a sequence number indicating the packet order of transmission.

Also, the frame decoder module 440 includes a retransmission attack processing unit performing a replay check by comparing an association number (AN) in the TCI field (S304) with the AN value input in the previous frame.

The retransmission attack processing unit receives an input from the frame classifier 410, of an encrypted MAC frame not corresponding to the DoS frame, and based on the Ethernet type value, determines whether it is a broadcast security channel or a unicast security channel.

After that, in relation to each security association (SA) the PN value is compared in the channel, and if the PN value of the currently input frame is less than or equal to the PN value input to the previously frame, regards the frame as a retransmission attack frame and deletes the frame, or else transmits the frame to the decoder 440.

However, if the AN flag value input in the previous frame is different from the AN flag value input in the current frame, it indicates that the period of a key has changed, and therefore the retransmission attack checking is not performed. If the input frame is not a retransmission frame, the frame decoder 440 transmits the AAD value and the Secure MSDU to the encryption unit 450.

The encryption unit 450 performs functions for authentication decryption and authentication check, by using the AAD and MSDU input from the frame decoder 440 and the key (S495) and IV (S496) input from the parameter verification unit 490.

The encryption unit 450 used in the MAC security reception unit 400 operates in authentication decryption mode and authentication check mode according to the KaY setting, and runs in a 1 Gbps or 2 Gbps mode.

In the authentication decryption mode, the Secure MSDU input from the frame decoder 400 is decrypted into a plaintext frame by using the key (S495) and IV (S496) input from the frame decoder 440.

Also, an integrity check value (ICV) of the AAD value and Secure MSDU input from the frame decoder 440 is calculated and compared with the ICV value included in the Secure MSDU in order to check whether or not the encrypted frame is altered during the transmission.

If the calculated ICV value is different from the input ICV value, the decrypted frame together with an authentication failure signal is transmitted. The ICV value included in the encrypted frame is the ICV value that is calculated in the transmission unit when the frame is encrypted.

In the authentication check mode, the decryption of the MSDU is not performed and only the ICV value of the input frame is calculated and compared with the ICV value included in the MSDU in order to check whether or not the input MAC frame is altered during the transmission.

Also, for the authentication check intensity, the ICV length is set to any one of 4, 8, 12, and 16 bytes according to a user definition. The authentication intensity varies with respect to the ICV length. The longer the ICV length is, the higher the authentication intensity becomes, and the shorter the ICV length, the lower the authentication intensity becomes. If the ICV length is increased in order to increase the authentication intensity, the amount of transmission processing is reduced, and if the ICV length is shortened in order to increase the transmission processing amount, the authentication intensity is lowered.

The ICV value is a hash value, and obtained by converting a long frame into a short message by using an encryption key. The shorter the ICV value becomes, the higher the probability that an identical ICV is obtained from calculation of different frames becomes, and the longer the ICV value becomes, the lower the probability becomes.

Accordingly, when a frame is altered, if the length of the ICV value is short, the possibility that the alteration cannot be checked increases.

Details of the encryption unit 450 will be explained later with reference to FIG. 5.

The frame assembling unit 460 performs a function generating a single MAC frame by assembling the plaintext MSDU input from the encryption unit 450 and the MAC header (S441) input from the frame decoder 440.

Before a plaintext MSDU is input from the encryption unit 450, the MAC header (S441) is input from the frame decoder 440 and stored in an internal register. If the plaintext MSDU is input, the plaintext MSDU is shifted for 5 clocks and the frame assembling unit 460 sequentially transfers values stored in the internal register from the preamble.

This operation is performed according to a 3-bit data counter. The 3-bit data counter counts 0 to 5 after being synchronized with an enable signal of the input plaintext MSDU. That is, if the counter is 0, the first preamble is transmitted, and if the counter is 1, a preamble including an LLID is transferred. If the counter is 2, destination address [47:16] is transmitted, if the counter is 3, destination address [15:0] and source address [47:32], and if the counter is 4, source address [31:0] is transmitted. After that, the 5-clock-shifted plaintext MSDU is transmitted.

The FCS generation unit 470 calculates a 4-byte FCS in relation to the plaintext MAC frame input from the frame assembling unit 460 and attaches the FCS to the end of the MAC frame.

FCS calculation is performed by using a CRC-32(B) cruise polynomial, "$G(x)=X32+X26+X23+X22+216+X12+X11+X10+X8+X7+X5+X4+X2+X+1$". Since the length of the MAC frame input from the frame assembling unit 460 varies, the FCS is calculated in units of bytes.

The 32-bit data input from the frame assembling unit 460 at each clock uses a 125 MHz clock frequency which is 4 times faster than the 31.25 MHz frequency used in the frame assembling unit 460. The 32-bit data input is divided into 8-bit units and the FCS is calculated in units of bytes.

The four calculated 1-byte FCS values are collected into 32-bit data values by using the 31.25 MHz frequency of the frame multiplexing module 312 and output.

The frame multiplexing unit 480 multiplexes the MAC frame (S431) input from the bypass unit 430 and the MAC frame (S312) input from the FCS generation unit 470 and transfers them to the upper layer (S313).

Since the processing time for passing the frame bypass module 303 is the same as the time taken for decryption, always only one frame is input at a time point. Also, the frame multiplexing module 312 informs to the upper layer whether the input MAC frame is a decrypted MAC frame or a non-decrypted MAC frame.

Figure 5:
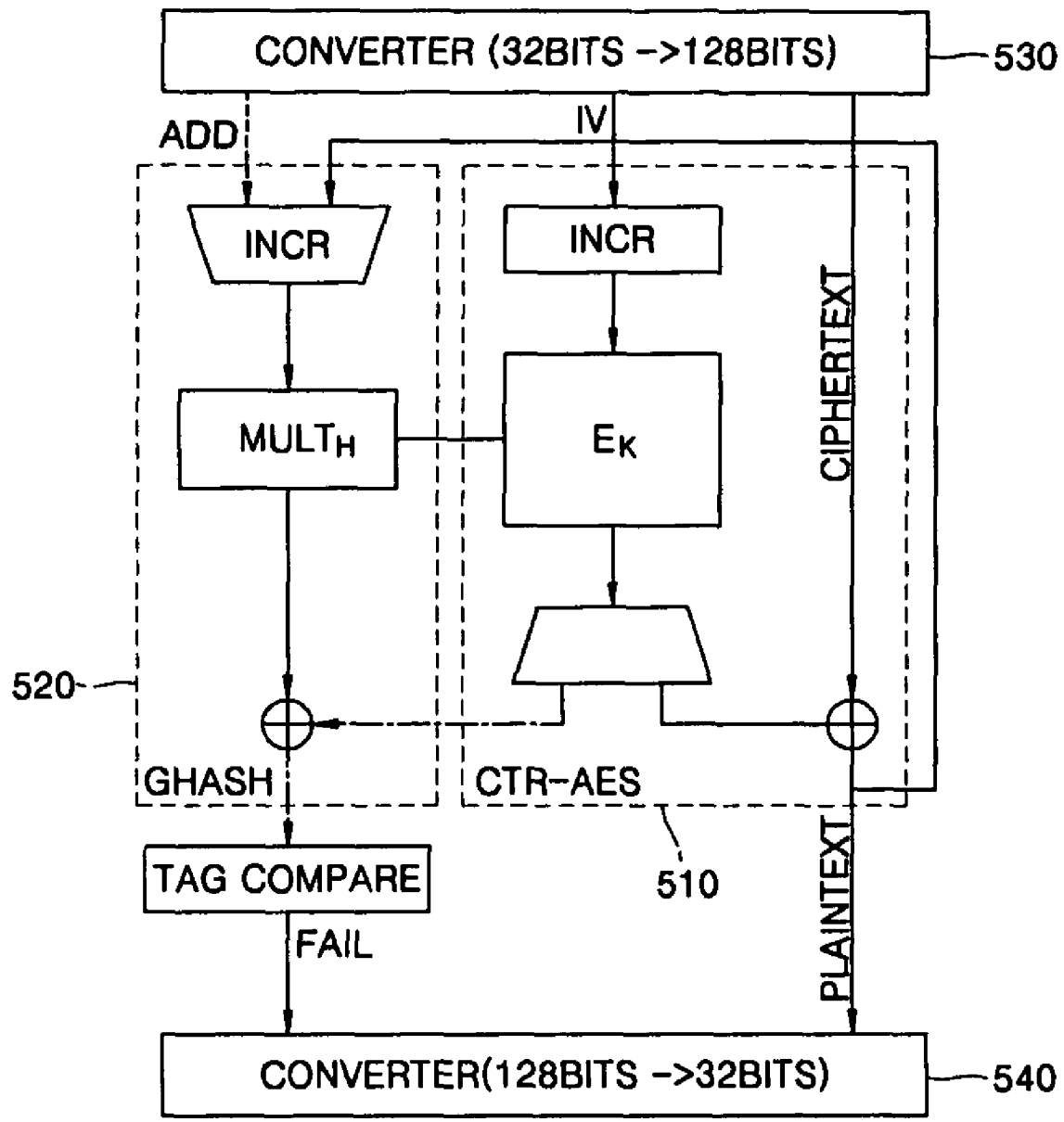
FIG. 5 illustrates the internal structure of an encryption unit according to an embodiment of the present invention.

FIG. 5 illustrates the internal structure of the encryption unit 450.

The encryption unit 450 is formed with a CTR-ASE module 510, a Galois message authentication code (GMAC) module 520, and two converters 530 and 540.

The encryption unit 450 performs frame decryption by using a CTR-AES algorithm, and performs authentication checking with a GMAC using a 4-digit serial type GF 2128. The AES algorithm includes a key expander module, and satisfies Federal Information Processing Standard (FIPS) 197 of the National Institute of Standards and Technology (NIST).

The key expander module receives an input of a non-extended 128-bit key, generates a 1408-bit extension key by a key expanding algorithm described in the FIPS 197, and provides 11 round keys, by providing 128 bits to each round of the AES.

In order to implement the MACsecY function 300 with a 1 Gbps performance, the encryption unit 450 operates at a 62.5 MHz clock speed and in order to implement the MACsecY function with a 2 Gpbs performance, operates at a 125 MHz clock speed.

Accordingly, in order to interface the frame decoder 440 and the frame assembling unit 460 that operate at a clock speed of 31.25 MHz (1 Gbps) or 62.5 MHz (2 Gbps), the encryption unit 450 includes an I/O interface for synchronization of these clocks. When the frame decoder operates at a 31.25 MHz clock speed, the encryption unit 450 performs frame authentication decryption and authentication checking.

The CTR-AES block provides data secrecy and data integrity by using the encryption and decryption functions. The GMAC module provides data authentication. Two converter blocks 530 and 540 provide functions converting 32-bit data into 128-bit data or 128-bit data into 32-bit data. Each of the size of data and the size of a key in the CTR-AES module and the GMAC module is 128 bits. The encryption unit 450 operates in the authentication encryption mode or in the authentication mode according to the mode value set in the KaY. Whether a channel is operated in the authentication encryption mode or authentication mode in relation to each LLID can be set in the KaY, and if the LLID of an input frame is transferred to the parameter generation unit by the frame classifier, the parameter generation unit notifies the mode set in the KaY.

Figure 6:
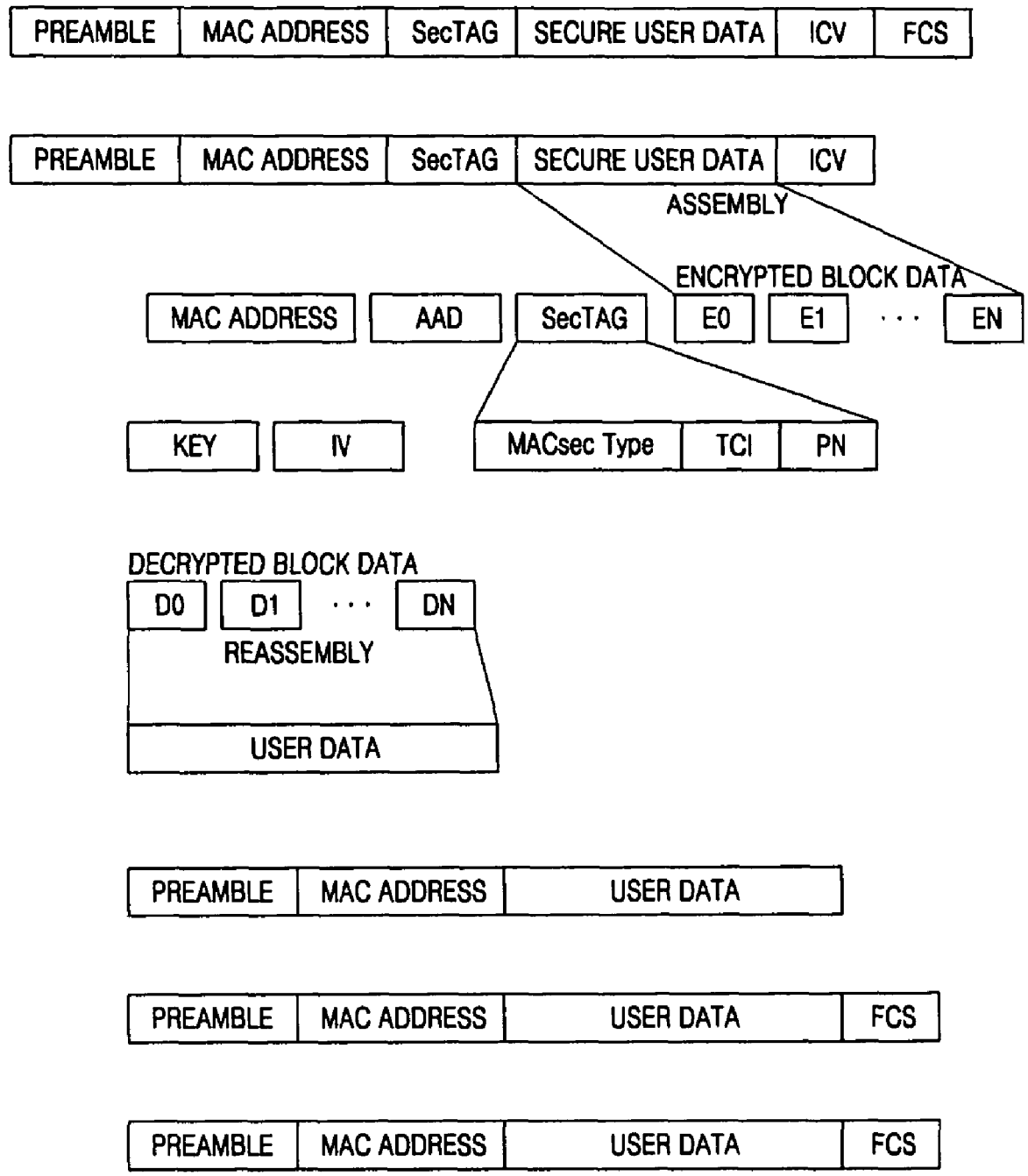
FIG. 6 illustrates steps of a process in which a frame is encrypted and decrypted in a MAC security apparatus according to an embodiment of the present invention.

FIG. 6 illustrates a process in which a frame is encrypted and decrypted in a MAC security apparatus according to an embodiment of the present invention.

Figure 7:
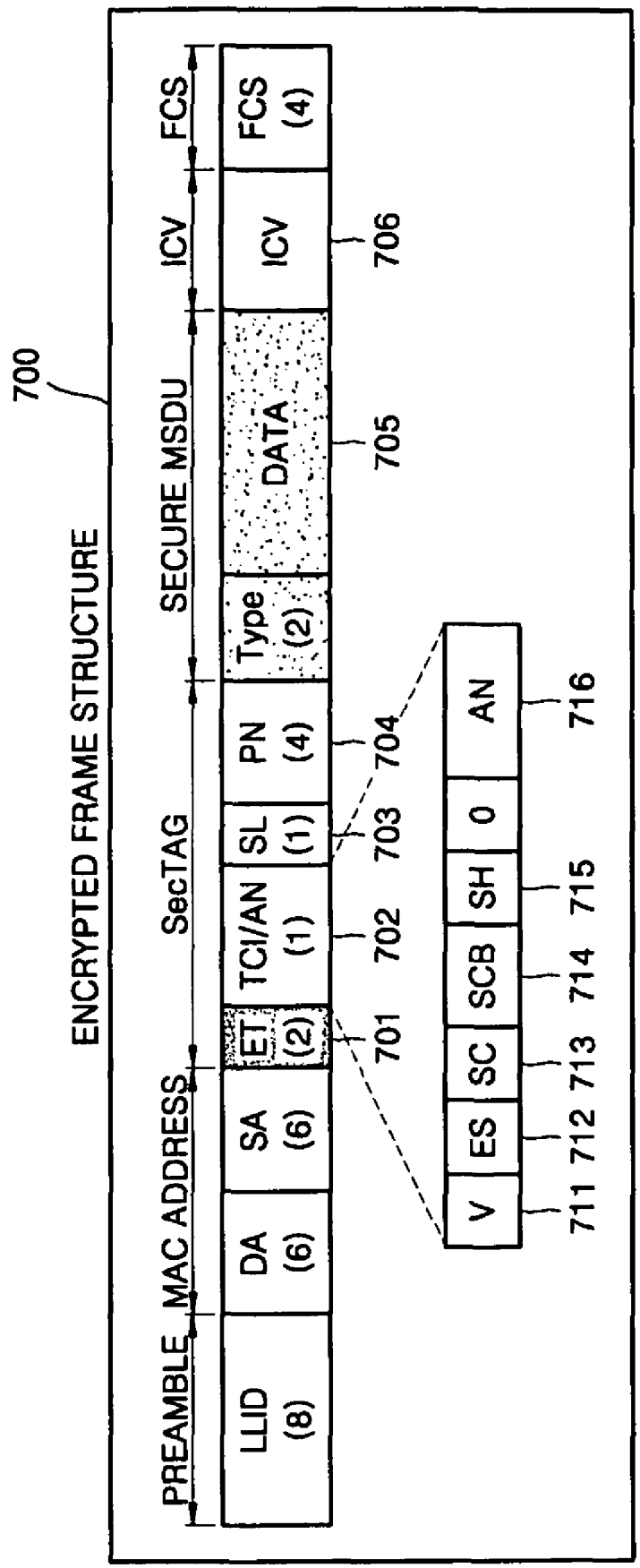
FIG. 7 illustrates the structure of an encrypted frame to be input to the reception unit of the MAC security apparatus illustrated in FIG. 4 according to an embodiment of the present invention.

FIG. 7 illustrates the structure of an encrypted frame 700 to be input to the reception unit of the MAC security apparatus illustrated in FIG. 4 according to an embodiment of the present invention.

The encrypted MAC frame input from a MAC module is encapsulated by adding an 8-byte SecTAG and a 16-byte ICV field 706. The 8-byte SecTAG is formed with a 2-byte Ethertype (ET) field 701 of a MAC security apparatus, a 1-byte TCI field 702, a 1-byte short length (SL) field 703, and a 4-byte PN field 704.

That is, in order to provide a MAC security service in an EPON network, at least 24 bytes should be added to the conventional MAC frame. In order to encrypt an ordinary MAC frame, encryption is performed from the MAC Ethertype field 701 to data 705 before the FCS.

The 1-byte TCI field 702 is formed with a 1-bit version field 711, a 1-bit ES field 712, a 1-bit SC field 713, a 1-bit SCB field 714, a 1-bit SH field 715, and a 2-bit AN field 716.

The SCB field 714 indicates whether or not a frame is a single copy broadcast frame, and is used to distinguish 4 SAs in the AN field 716. The SH field 715 indicates when the size of a frame is less than 64 bytes and the length is indicated in the 1-byte SL field 703.

Figure 8:
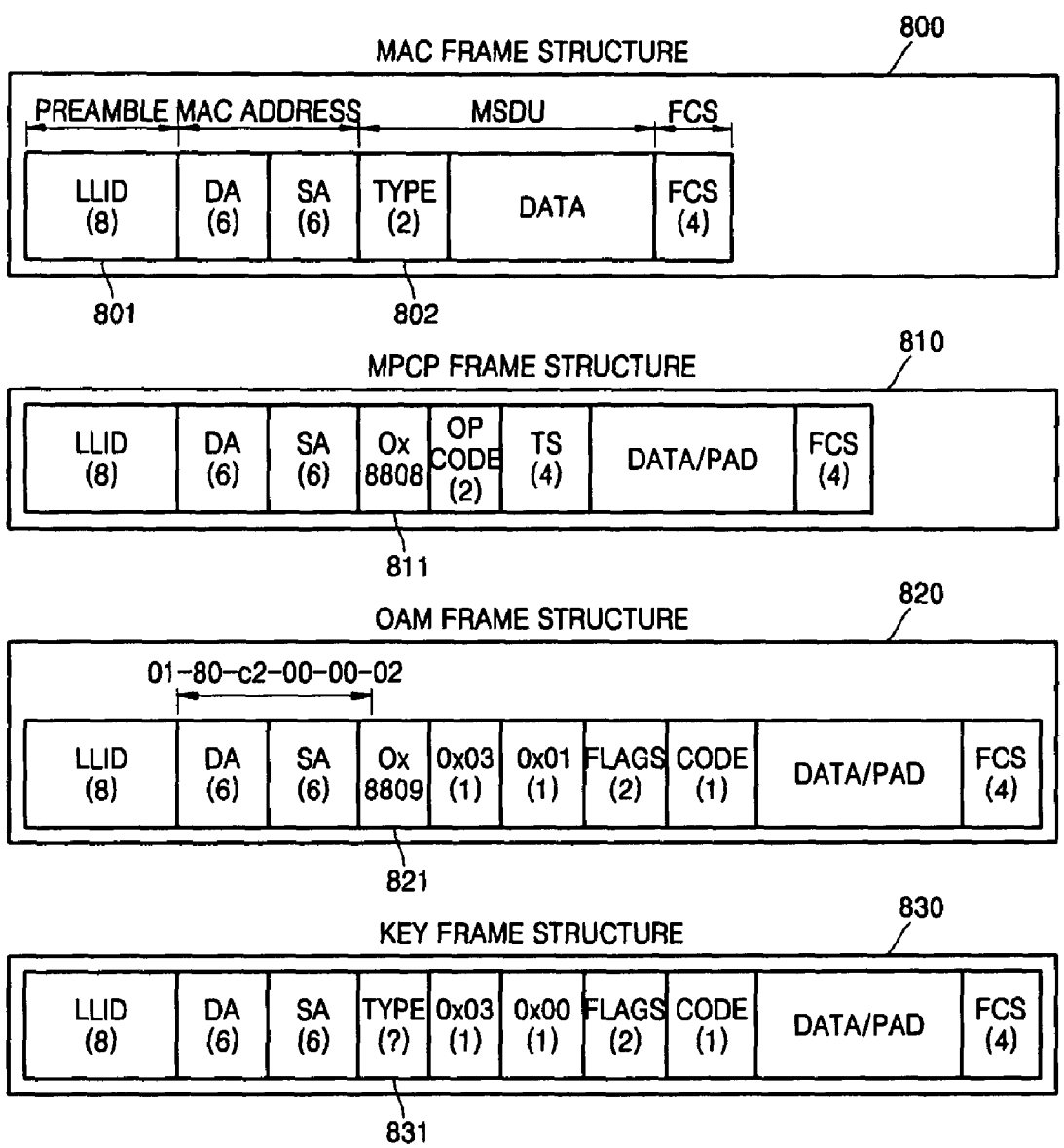
FIG. 8 illustrates the structure of each type of a non-encrypted plaintext frame input to and output from the reception unit of the MAC security apparatus illustrated in FIG. 4 according to an embodiment of the present invention.

FIG. 8 illustrates the structure of each type of a non-encrypted plaintext frame input to and output from the MACsecY reception unit illustrated according to an embodiment of the present invention in FIG. 4. To the MACsecY reception unit, the encrypted frame 700 illustrated in FIG. 7 is input from a MAC module or a variety of types of frames 800, 810, 820 and 830 that are not encrypted and illustrated in FIG. 8 are input.

The frames not encrypted and input from the MAC module include a MAC data frame 800, an MPCP frame 810, an OAM frame 820, and a key frame 830. These frames are distinguished by 2-byte MAC Ethertype fields 802, 811, 821, and 831.

The Ethertype field 811 of the MPCP frame 810 has a value of 0x8808, and the Ethertype field 821 of the OAM frame 820 has a value of 0x8809. Since the value of Ethertype field 831 of the current key frame 830 has not been determined yet, the value is user-defined. The Ethertypes of the remaining frames are considered as that of the data frame 800.

If the encrypted frame 700 illustrated in FIG. 7 is decrypted in the MAC security apparatus, it is transferred to the multi point MAC control module in the form of any one of the frames 800, 810, 820, and 830 illustrated in FIG. 8.

Figure 9:
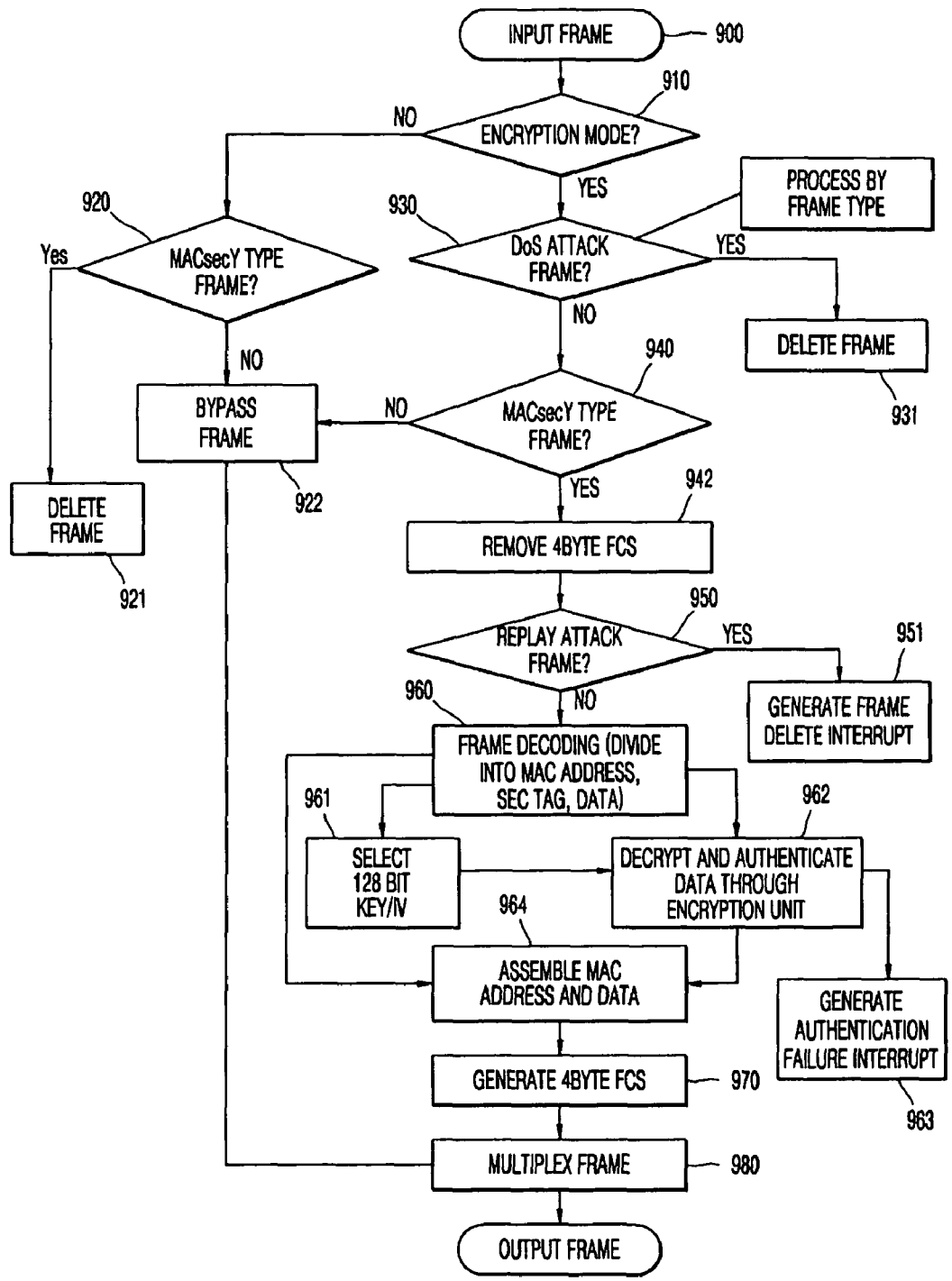
FIG. 9 is a flowchart illustrating the entire operating sequence of a reception unit of a MAC security apparatus according to an embodiment of the present invention.

FIG. 9 is a flowchart illustrating the entire operating sequence of a reception unit of a MAC security apparatus according to an embodiment of the present invention.

The flowchart of FIG. 9 relates to operations for transmitting the encrypted frame 700 or the non-encrypted frames 800, 810, 820, and 830 as a plaintext MAC frame through bypass or authentication decryption processes. Whenever a frame is input, the bypass or authentication encryption process is repeated circularly.

An encrypted frame 700 or non-encrypted frame 800, 810, 820, and 830 is input from a MAC module. A MAC security reception unit stores a parameter set received from a parameter verification unit and the operation mode of an encryption unit in advance, otherwise the unit operates in a default mode that does not support a security service in operation 910.

If the MAC security reception unit is in the non-encryption mode, it is determined whether the input frame is an encrypted frame 700 or a non-encrypted frame 800, 810, 820, or 830 in operation 920. If the encrypted frame 700 is input, the input frame is deleted in operation 921 because the MAC reception module is in the non-encryption mode.

If a non-encrypted frame 800, 810, 820, or 830 is input, the input frame is delayed for a time as required for the decryption process and then is bypassed in operation 922. The bypassed frame is transmitted to a frame multiplexing unit in order to multiplex the frame with a decrypted frame in operation 980.

If the MAC security reception unit is set in the encryption mode, it is determined in relation to each frame whether or not the frame is a DoS attack frame based on the user-defined parameter value.

FIG. 10 is a table showing processing steps of an input frame with respect to a user-set service denial attack application parameter value in relation to each frame according to an embodiment of the present invention. However, this is a preferred embodiment of the present invention and it should be noted that this does not limit the technological idea of the present invention.

If the frame does not correspond to a DoS attack frame, it is determined based on the Ethernet type value of the frame whether the frame is an encrypted frame or a plaintext frame in operation 940.

If the frame is a non-encrypted plaintext frame, the frame is delayed for a time as required for the decryption process and then is bypassed in operation 922.

If the frame is an encrypted frame, the 4-byte FCS value attached to the end of the encrypted frame is deleted in order to perform an authentication decryption process in operation 942.

With the encrypted frame in which the 4-byte FCS is removed, the current security association is determined based on the AN flag value, and if the current security association is the same as that of the previous input frame, the PN value of the frame is compared in order to check a retransmission attack in operation 950.

That is, if the PN of the current frame is less than or equal to the PN' of the previous frame, it is determined that the frame corresponds to a retransmission attack, and the frame is deleted and an interrupt signal is transmitted to a KaY in operation 951.

If the frame is not a retransmission attack frame, it is determined that the frame is a normal frame, and the frame is transmitted. Then, the PN value input to the current frame is stored in PN', and the encrypted frame in which the 4-byte FCS is removed is decoded into a MAC address, a SecTAG, a PN, an MD, and a Secure MSDU in operation 960. By using the TCI value of the decoded SecTAG and PN, a key and IV to be used for authentication decryption are selected in operation 961.

The encryption unit authenticates the encrypted data by using the key, IV, AAD, and Secure MSDU, and decrypts the data into plaintext MSDU in operation 962. If the authentication is refused, in a clock next to the decrypted plaintext MSDU, a fail signal is activated and an interrupt signal is transmitted to a CPU in operation 963. The interrupt generation period is controlled through the KaY.

The decrypted plaintext MSDU is assembled with the decoded MAC address (S610) such that a decrypted plaintext MAC is generated in operation 964.

A 4-byte FCS value is generated and added to the decrypted plaintext MAC frame in order to check an error that may occur during the transmission in operation 970. In order to transmit the bypassed frame and the decrypted plaintext frame to a MAC control sub-layer, the MAC security reception unit multiplexes the frames and the multiplexed frames are transferred to the multi point MAC control module in operation 980.

Figure 11A:
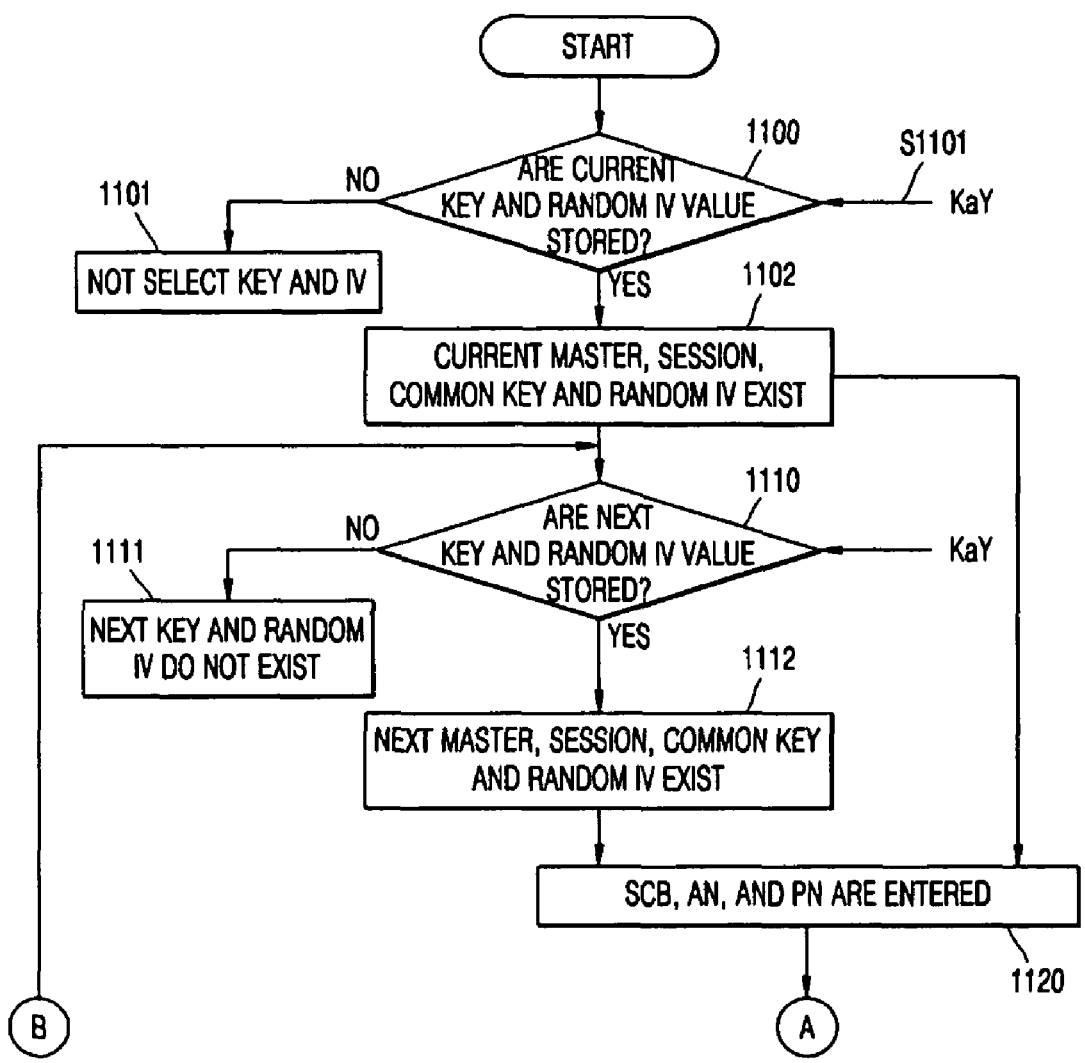
FIGS. 11a and 11b illustrate detailed flowcharts of methods of selecting KEY and IV in the flowchart illustrated in FIG. 9 according to an embodiment of the present invention.
Figure 11B:
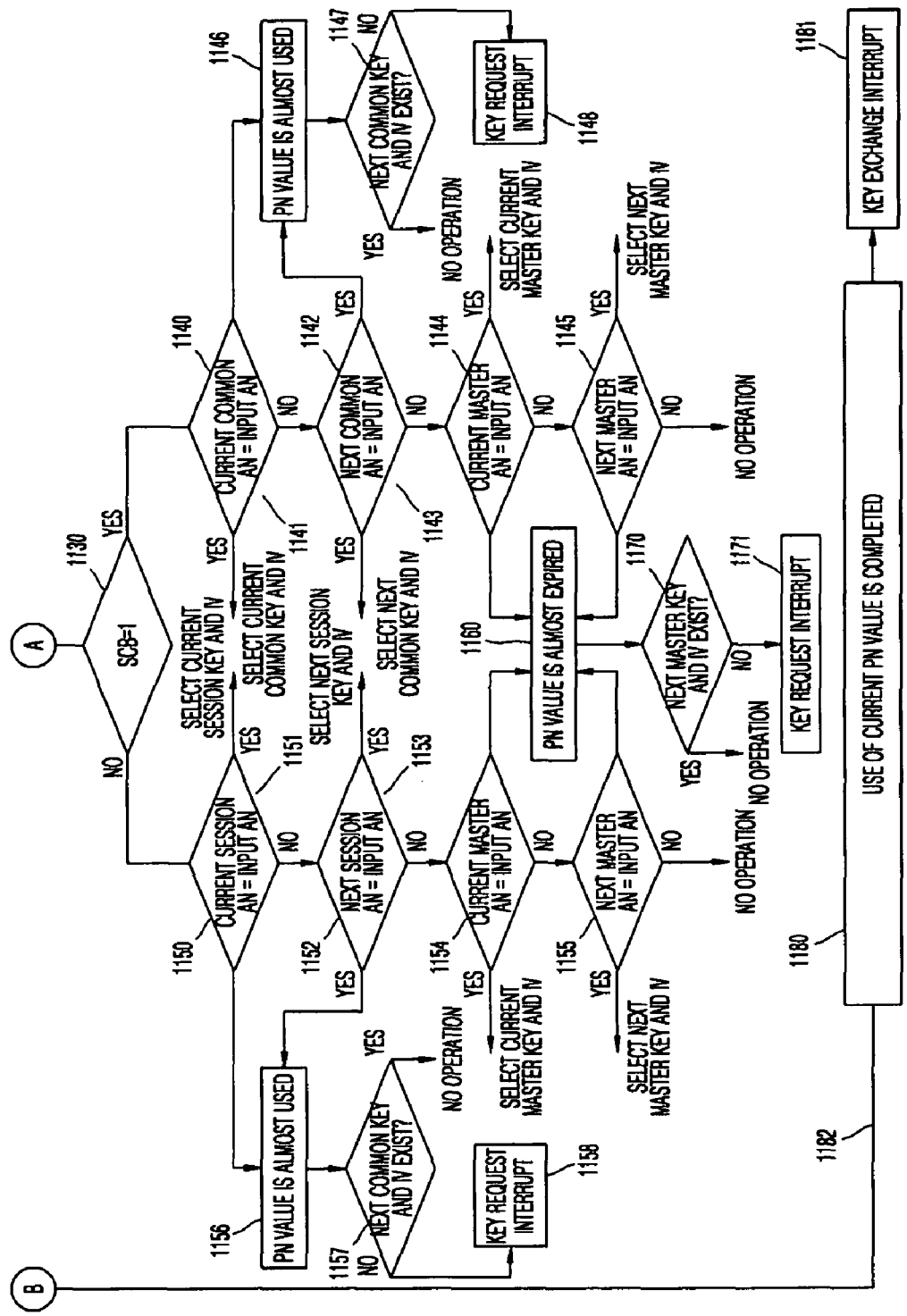

FIG. 10 is a table showing processing steps of an input frame with respect to a user-set DoS attack application parameter value in relation to each frame according to an embodiment of the present invention. FIGS. 11a and 11b illustrate detailed flowcharts of methods of selecting a key and IV in the flowchart illustrated in FIG. 9 according to an embodiment of the present invention. The methods shown in FIG. 11 relate to an operation for selecting the key and IV used in the authentication decryption of a frame, and is performed whenever an encrypted frame is input.

A KaY stores a current key and a random IV value in relation to each security association in a MACsecY reception unit in operation 1100.

If there are no key and random IV value (S101) input from the KaY, the key and IV are not selected in operation 1101.

If a current master, current session, current common key and random IV value are input from the KaY, they are stored in the internal register of the MAC security reception unit in operation 1102.

After storing the current key and random IV value in the MACsecY reception unit in operation 701, the KaY may store the next key and random IV value in operation 110. If the next master, next session, next common key and random IV value are input from the KaY, they are stored in the internal register of the MACsecY reception unit in operation 1112.

If the next master, next session, next common key and random IV value from the KaY are not input, the key and random IV will not be in the internal register of the MACsecY reception unit in operation 1111.

The encrypted frame is decoded and SCB information, AN flag information and the PN value are input in operation 1120. By using the SCB flag value in the SecTAG, it is checked whether the frame is a broadcast security channel or a unicast security channel.

If the SCB flag value is 1, the frame corresponds to a broadcast security channel and the common key and IV are selected in operation 1130. If the input AN value is the same as the current common AN value set in the KaY, the current common key and IV register value are selected in operation 1141. Unlike this, if the input AN value is the same as the next common AN value set in the KaY in operation 1142, the next common key and IV register value are selected in operation 1143.

If the SCB information is 0, that is, if the input frame corresponds to a unicast security channel, the session key and IV are selected. If the input AN value is the same as the current session AN value set in the KaY in operation 1150, the current session key and IV register value are selected in operation 1153.

Then, regardless of the SCB information, if the input AN value is the same as the current master AN value set in the KaY in operations 1144 and 1154, the current master key and IV register value are selected. Unlike this, if the input AN value is the same as the next master AN value set in the KaY, the next master key and IV register value are selected.

If the input frame is a frame requiring a master key and IV in operations 1144, 1145, 1154, and 1155, and the PN value is an almost-expired state in operation 1160, it is confirmed whether or not in the internal register there are a subsequent master key and random IV to be used in the next key period in operation 1170. Then, if there are no subsequent master keys and random IV, a key request interrupt signal is transmitted to the KaY in operation 1171.

If there are a subsequent master key and random IV, the key request interrupt does not occur. If the input frame is a frame requiring a session key and IV in operations 1150 and 1152 and the PN value is an almost-expired state in operation 1156, it is confirmed whether or not in the internal register there are a subsequent common key and random IV to be used in the next key period in operation 1157. Then, if there are no subsequent common keys and random IVs, a key request interrupt signal is transmitted to the KaY in operation 1158.

If there are a subsequent key and random IV, the key request interrupt does not occur. If the input frame is a frame requiring a common key and IV in operations 1140 and 1142 and the PN value is an almost-expired state in operation 1146, it is confirmed whether or not in the internal register there are a next common key and random IV to be used in the next key period in operation 1147. Then, if there are no next common key and random IV, a key request interrupt signal is transmitted to the KaY in operation 1148.

If there are a subsequent common key and random IV, the key request interrupt does not occur. The scope of the almost-expired state of the PN is set by the KaY.

If the input PN value is a key exchange state in operation 1180, the current key usage period is completed and an interrupt indicating the use of a subsequent key is transferred to the KaY in operation 1181.

If the subsequent key and random IV are used, it is expressed that the subsequent key and random IV value to be used in the next period do not exist in operation 1182.

If the subsequent key and random IV value to be used in the next period are input from the KaY in operation 110, it is expressed that the subsequent key and random IV value to be used in the next period exist in operation 1112.

The present invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

The present invention provides a MAC security apparatus which provides secrecy of information to subscribers, and protection of contents and billing capability in relation to subscribers' access to service providers, and in relation to security problems in an EPON subscriber network, provides integrity of subscriber traffic and allows access blocking of unauthenticated apparatuses and subscribers. The present invention also provides a transmission method and reception method for link security in the MAC security apparatus.

In addition, the present invention provides functions for frame security and frame authentication, a function for implementation of easy compatibility with the conventional EPON structure, and a function for blocking a variety of encryption attacks.

That is, the MAC security apparatus according to the present invention is capable of checking the secrecy, authentication, and integrity of a frame in the EPON network, and provides a function to prevent encryption attacks, and makes ranging and upward bandwidth allocation in the EPON Network easier. Also, the apparatus allows the security policy to be operated differently in relation to each LLID and frame.

What is claimed is:

1. An apparatus of media access control (MAC) security transmission comprising:
   a frame classifier distinguishing the type of a frame, and based on a logical link identifier (LLID) of the distinguished frame, determining whether or not the frame is of a security link to which a security function is to be applied, wherein a frame to which the security function is to be applied is a security-function-applied frame;
   a bypass unit delaying a no-security-function frame so that a processing time for converting the security-function-applied frame classified in the frame classifier into an encrypted frame is the same as a processing time for the no-security-function frame; and
   a parameter generation unit transmitting in relation to each of a plurality of LLIDs, a parameter set used in the encryption, decryption and authentication of the frame, the parameter set including a security-function-application setting signal, a frame decryption signal, an encryption mode selection signal, and an authentication intensity adjustment signal,
      wherein the frame classifier receives the encryption mode selection signal as a mode parameter value for selecting an encryption algorithm from the parameter generation unit and selects whether an authentication decryption algorithm or an authentication algorithm is to be applied to the frame; and
   an encryption unit, wherein the authentication intensity adjustment signal is a parameter value ICV Size received by the encryption unit for confirming whether or not a frame is authenticated, wherein changing the ICV Size parameter value in the authentication decryption algorithm or the authentication algorithm changes the authentication intensity.

2. An apparatus of a media access control (MAC) security reception unit comprising:
   a frame classifier determining based on a logical link identifier (LLID) value of a frame whether or not a security function is applied to the frame, determining based on a type value of the frame whether the frame is an encrypted frame or a on-encrypted plaintext frame, and configured to process a denial of service (DoS) attack frame based on a user-defined parameter value in relation to the frame;
   a parameter verification unit transmitting a parameter set used in decryption and authentication of the frame;
   a retransmission attack processing unit, if the frame corresponds to a retransmission attack frame, removing the frame based on an association number (AN) flag value of the frame; and
   a bypass unit delaying the plaintext frame so that a processing time taken for decrypting the encrypted frame is the same as a time of processing the plaintext frame.

3. The apparatus of claim 2, further comprising:
   an encryption unit performing in relation to the frame, an authentication decryption function decrypting the encrypted frame into a plaintext frame by using a parameter value input from the parameter verification unit, and identifying whether or not the encrypted frame is altered, or performing an authentication check function only identifying whether or not the encrypted frame is altered.

4. The apparatus of claim 3, wherein in the determination of whether or not the frame is altered, by changing an ICV_Size parameter value in the authentication encryption algorithm or in the authentication algorithm based on the ICV_Size parameter value input from the parameter verification unit, the authentication intensity is changed.

5. The apparatus of claim 2, wherein the frame classifier receives a parameter mode value for selecting an algorithm from the parameter verification unit and selects whether one of an authentication decryption algorithm (GCM-AES) and an authentication algorithm (G-MAC) is to be applied to the frame in the encryption unit.

6. The apparatus of claim 2, wherein the parameter verification unit checks the state of an encryption key used in the decryption of the frame based on a packet number value of the frame, and transmits an encryption key expiry signal, an encryption key conversion signal, and an encryption key update signal.

7. A media access control (MAC) security apparatus comprising:
   a MAC security transmission unit classifying a frame based on a logical link identifier (LLID) value and the type of the frame, generating a first parameter set for setting or canceling information indicating whether or not a security function is to be applied, in relation to the type of the frame based on the LLID, determining whether or not the security function is to be applied to the frame, and delaying a no-security-function frame so that a processing time for converting a security-function-applied frame into an encrypted frame is the same as a processing time for the no-security-function frame; and
   a MAC security reception unit checking based on the LLID value whether or not an encryption mode of a received frame is set, determining based on the type of the received frame whether the received frame is an encrypted frame or a non-encrypted plaintext frame, processing a denial of service (DoS) attack frame in relation to each received frame based on a frame type value, generating a second parameter set used in the authentication and decryption of the received frame, and delaying the received frame when the received frame is a plaintext frame so that a processing time taken for decrypting the received frame when the received frame is an encrypted frame is the same as a time for processing the received frame when the received frame is a plaintext frame.

8. The apparatus of claim 7, wherein a mode parameter value for selecting an algorithm is input from one of the first parameter set and the second parameter set, and whether an authentication decryption algorithm (GCM-AES) is to be applied or an authentication algorithm (G-MAC) is to be applied to the frame is selected, and in order to change the authentication intensity in the algorithm, the authentication decryption algorithm or the authentication algorithm selectively uses an ICV_Size parameter value confirming whether or not the frame is authenticated.

9. The apparatus of claim 7, further comprising:
an encryption unit, performing in relation to the frame, an authentication decryption function decrypting an encrypted frame into a plaintext frame by using the second parameter set, and identifying whether or not the encrypted frame is altered, or performing an authentication check function only identifying whether or not the encrypted frame is altered.

10. A frame transmission method in a media access control (MAC) security transmission apparatus comprising:
determining based on a logical link identifier (LLID) value of a frame whether or not a security function is to be applied, wherein a frame to which the security function is to be applied is a security-function-applied frame;
delaying a no-security-function frame so that a processing time for converting a security-function-applied frame into an encrypted frame is the same as a processing time for the no-security-function frame; and
in relation to each of a plurality of LLIDs, transmitting a parameter set used in the encryption, decryption and authentication of the frame, the parameter set including a security-function-application setting signal, a frame decryption signal, an encryption mode selection signal, and an authentication intensity adjustment signal,
encoding the frame;
based on a mode parameter value in the parameter set selecting an engryption algorithm, applying an authentication decryption algorithm and an authentication algorithm to the frame;
multiplexing the encrypted frame and the no-security-function frame; and
according to an ICV Size parameter value in the parameter set, confirming whether or not the frame is authenticated, changing the authentication intensity in one of the authentication decryption algorithm and the authentication algorithm.

11. A frame reception method in a media access control (MAC) security reception apparatus comprising:
based on a logical link identifier (LLID) value of a frame, determining whether or not a security function is applied to the frame;
determining based on a type value of the frame whether the frame is an encrypted frame or a non-encrypted plaintext frame, and processing a DoS attack frame based on a user-defined parameter value in relation to the frame;
transmitting a parameter set used in the decryption and authentication of the frame;
based on an AN flag value of the frame, if the frame corresponds to a retransmission attack frame, removing the frame; and delaying the plaintext frame so that a processing time taken for decrypting the encrypted frame is the same as a time for processing the plaintext frame.

12. The method of claim 11, further comprising:
decoding the frame;
applying one of an authentication decryption algorithm (GCM-AES) and an authentication algorithm (G-MAC) to the frame based on a mode parameter value in the parameter set, for selecting an encryption algorithm;
changing the authentication intensity in the authentication decryption algorithm or the authentication algorithm according to an ICV_Size parameter value in the parameter set, for confirming whether or not the frame is authenticated; and
multiplexing the encrypted frame and the no-security-function frame.

13. A frame transmission and reception method in a media access control (MAC) security apparatus comprising:
classifying a frame and determining whether or not a security function is to be applied, based on a logical link identifier (LLID) value and the type of the frame;
in relation to each of a plurality of LLIDs, transmitting a parameter set used in the encryption, decryption and authentication of the frame, the parameter set comprising a security-function-application setting signal, a frame decryption signal, an encryption mode selection signal, and an authentication intensity adjustment signal;
delaying a no-security-function frame so that a processing time for converting the security-function-applied frame into an encrypted frame is the same as a time for processing the no-security-function frame;
authentication decrypting or authenticating the frame;
based on the LLID value, determining whether or not an encryption mode is set in the frame;
determining based on a type value of the frame whether the frame is an encrypted frame or a non-encrypted plaintext frame, and processing a DoS attack frame in relation to the frame based on the frame type value;
delaying the plaintext frame so that a processing time taken for decrypting the encrypted frame is the same as a time for processing the plaintext frame; and
transmitting a second parameter set used in the authentication and decryption of the frame.

14. The method of claim 13, further comprising:
receiving a mode parameter value for selecting an algorithm from one of the first parameter set and the second parameter set, and selecting whether an authentication decryption algorithm (GCM-AES) or an authentication algorithm (G-MAC) is to be applied to the frame.

15. The method of claim 13, further comprising:
changing the authentication intensity in one of the authentication decryption algorithm and the authentication algorithm according to an ICV_Size parameter value in the one of the first parameter set and the second parameter set, for confirming whether or not the frame is authenticated.

16. The method of claim 13, further comprising:
checking the state of an encryption key used in the decryption of the frame based on the packet number value of the frame, and transmitting an encryption key expiry signal, an encryption key conversion signal, and an encryption key update signal.

* * * * *